US011627362B2

(12) United States Patent
Zvinakis et al.

(10) Patent No.: US 11,627,362 B2
(45) Date of Patent: Apr. 11, 2023

(54) TOUCH GESTURE CONTROL OF VIDEO PLAYBACK

(71) Applicant: Google LLC, Mountain View, CA (US)

(72) Inventors: Andrea Zvinakis, San Francisco, CA (US); Kurt Wilms, San Francisco, CA (US); Bryce Gibson Reid, Menlo Park, CA (US); Matthew Turner Smith, Alameda, CA (US); Garen Checkley, San Francisco, CA (US)

(73) Assignee: Google LLC, Mountain View, CA (US)

(*) Notice: Subject to any disclaimer, the term of this patent is extended or adjusted under 35 U.S.C. 154(b) by 130 days.

(21) Appl. No.: 16/550,975

(22) Filed: Aug. 26, 2019

(65) Prior Publication Data
US 2019/0394514 A1  Dec. 26, 2019

Related U.S. Application Data

(63) Continuation of application No. 15/044,900, filed on Feb. 16, 2016, now Pat. No. 10,397,632.

(51) Int. Cl.
*H04N 21/422* (2011.01)
*G06F 3/04883* (2022.01)
(Continued)

(52) U.S. Cl.
CPC ......... *H04N 21/422* (2013.01); *G06F 3/0484* (2013.01); *G06F 3/0488* (2013.01);
(Continued)

(58) Field of Classification Search
CPC ........... H04N 21/422; H04N 21/41407; H04N 21/4325; H04N 21/47217; G06F 3/0484; G06F 3/0488; G06F 3/04883
See application file for complete search history.

(56) References Cited

U.S. PATENT DOCUMENTS 6,396,523 B1   5/2002   Segal et al.
8,363,009 B1   1/2013   Queru
(Continued)

FOREIGN PATENT DOCUMENTS

CN   103116467 A   5/2013
CN   103329075 A   9/2013
(Continued)

OTHER PUBLICATIONS

Lopez, Napier, "Twitter shows off 'ScratchReel' GIFs you can rewind" Nov. 12, 2015, 5 pages, The Next Web, Inc.; http://thenextweb.com/twitter/2015/11/12/twitter-shows-off-scratchreel-gifs-you-can-rewind/#grefdownloaded on Feb. 10, 2016.
(Continued)

*Primary Examiner* — Kyu Chae
(74) *Attorney, Agent, or Firm* — Lowenstein Sandler LLP

(57) ABSTRACT

A video item is provided for playback at a media player executing at a user device. The media player is logically divided into multiple sections. An indication of a touch gesture made by a user with respect to a touchscreen of the user device is received. Whether the touch gesture with respect to the touchscreen of the user device qualifies as a first predetermined touch gesture is determined. The first predetermined touch gesture is within a portion of a user interface (UI) that is includes in a first section of the media player. Responsive to determining the touch gesture with respect to the touchscreen of the user device qualifies as the first predetermined gesture, the playback of the video item is moved from a first point in time to a second point in time by a predetermined amount of time.

17 Claims, 6 Drawing Sheets

(51) Int. Cl.
*G06F 3/0484* (2022.01)
*G06F 3/0488* (2022.01)
*H04N 21/414* (2011.01)
*H04N 21/472* (2011.01)
*H04N 21/432* (2011.01)

(52) U.S. Cl.
CPC ... *G06F 3/04883* (2013.01); *H04N 21/41407* (2013.01); *H04N 21/4325* (2013.01); *H04N 21/47217* (2013.01)

(56) References Cited

U.S. PATENT DOCUMENTS

| | | | |
|---|---|---|---|
| 8,446,363 | B1 | 5/2013 | Queru |
| 8,627,235 | B2 | 1/2014 | Chang et al. |
| 8,836,648 | B2 | 9/2014 | Wilairat |
| 9,152,235 | B2 | 10/2015 | Wardenaar |
| 9,652,125 | B2 | 5/2017 | Penha et al. |
| 10,397,632 | B2* | 8/2019 | Zvinakis .......... H04N 21/47217 |
| 2007/0236472 | A1 | 10/2007 | Bentsen et al. |
| 2008/0084400 | A1 | 4/2008 | Rosenberg |
| 2008/0122796 | A1 | 5/2008 | Jobs et al. |
| 2008/0297484 | A1 | 12/2008 | Park et al. |
| 2009/0077491 | A1* | 3/2009 | Kim .................... G06F 3/04847 715/810 |
| 2009/0174677 | A1 | 7/2009 | Gehani et al. |
| 2010/0088634 | A1 | 4/2010 | Tsuruta et al. |
| 2010/0107116 | A1 | 4/2010 | Rieman et al. |
| 2010/0302172 | A1 | 12/2010 | Wilairat |
| 2011/0055773 | A1 | 3/2011 | Agarawala et al. |
| 2012/0030636 | A1 | 2/2012 | Miyazaki |
| 2012/0050185 | A1 | 3/2012 | Davydov et al. |
| 2012/0054612 | A1* | 3/2012 | Bok ................... H04N 21/4312 715/716 |
| 2012/0079386 | A1 | 3/2012 | Kim et al. |
| 2012/0179970 | A1 | 7/2012 | Hayes |
| 2013/0024807 | A1* | 1/2013 | Kobayashi ............ G06F 1/1647 715/781 |
| 2013/0067332 | A1 | 3/2013 | Greenwood et al. |
| 2013/0307792 | A1 | 11/2013 | Andres et al. |
| 2013/0332836 | A1 | 12/2013 | Cho |
| 2014/0109012 | A1 | 4/2014 | Choudhary et al. |
| 2014/0178047 | A1* | 6/2014 | Apodaca ............ G06F 3/04886 386/248 |
| 2014/0258854 | A1 | 9/2014 | Li |
| 2014/0344697 | A1 | 11/2014 | Liu |
| 2014/0368734 | A1 | 12/2014 | Hoffert et al. |
| 2015/0121225 | A1 | 4/2015 | Somasundaram et al. |
| 2015/0185840 | A1 | 7/2015 | Golyshko et al. |
| 2015/0193111 | A1 | 7/2015 | Kauffmann et al. |
| 2015/0288996 | A1* | 10/2015 | van der Schaar ............................ H04N 21/234327 725/116 |
| 2015/0309686 | A1 | 10/2015 | Morin et al. |
| 2015/0370402 | A1 | 12/2015 | Checkley |
| 2015/0370455 | A1* | 12/2015 | Van Os ............... G06F 3/04817 345/173 |
| 2016/0139794 | A1* | 5/2016 | Hammendorp ......... H04L 67/10 715/716 |
| 2016/0299648 | A1* | 10/2016 | Migos ................... G06F 3/0483 |
| 2016/0342301 | A1 | 11/2016 | Kato et al. |
| 2017/0006252 | A1 | 1/2017 | Patel et al. |
| 2017/0109011 | A1 | 4/2017 | Jiang |

FOREIGN PATENT DOCUMENTS

| | | |
|---|---|---|
| CN | 103491402 A | 1/2014 |
| CN | 104935990 A | 9/2015 |
| RU | 2013132556 A | 1/2015 |
| RU | 2014109754 A | 9/2015 |

OTHER PUBLICATIONS

Duboff, Sam, "All SnappyTV GIFs are now ScratchReels", Nov. 12, 2015, 2 pages, About SnappyTV, Product Announcements; http://blog.snappytv.com/?p=2169 downloaded on Feb. 16, 2016.

Kaplan, Tracy, "Storytelling with GIFs", Jun. 10, 2014, 3 pages, SnappyTV, Customer Examples, Product Announcements; http://blog.snappytv.com/?p=2053 downloaded on Feb. 16, 2016.

International Search Report and Written Opinion dated May 11, 2017, on Application No. PCT/US2016/069154.

Great Britain Combine Search Report and abbreviated Examination Report Section 18(3) dated Jun. 5, 2017, on application No. GB1622355.4.

Jeff Benjamin "How to add swipe gestures to video playback" Mar. 14, 2014 https://www.idownloadblog.com/2014/03/14/videogestures/.

David Gonzales "Using Gestures to Control the Media Player" Sep. 21, 2014 http://www.malmstein.com/blog/2014/09/21/control-the-meddia-player-using-gestures/.

* cited by examiner

TOUCH GESTURE CONTROL OF VIDEO PLAYBACK

RELATED APPLICATION

This application is a continuation application of U.S. patent application Ser. No. 15/044,900, filed on Feb. 16, 2016, the entire contents of which are hereby incorporated by reference herein.

TECHNICAL FIELD

This disclosure relates to the field of content sharing platforms and, in particular, controlling the display of video items on a user device using touch gestures.

BACKGROUND

Social networks connecting via the Internet allow users to connect to and share information with each other. Many social networks include a content sharing aspect that allows users to upload, view, and share content, such as video items, image items, audio items, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

The consumption of content, such as video items, using content sharing platforms is increasingly being performed on user devices, such as mobile devices. A user device may include a touchscreen. A touchscreen may refer to a display screen that includes an input device, integrated with the display screen, to receive touch-based inputs from a user and control the user device responsive to the touch-based inputs. For example, a user may use a touch gesture as an input to control the mobile device.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for controlling playback of a video item is disclosed. The method includes providing a video item for playback in a portion of a user interface (UI) of an application executed on a user device. The portion of the user interface includes a media player to play the video item. The method further includes monitoring user input to a touchscreen of the user device for a touch gesture. The method also includes receiving an indication of a touch gesture made by a user of the user device. The method continues by determining whether the touch gesture is a swipe gesture within the portion of the UI that includes the media player. The method moves the playback of the video item from a first point in time to a second point in time by a predetermined amount of time in response to determining the touch gesture is a swipe gesture within the portion of the UI comprising the media player.

In another implementation, determining whether the touch gesture is the swipe gesture within the portion of the UI that includes the media player includes determining that the touch gesture is the swipe gesture and determining whether a start point of the swipe gesture is located within the media player.

In other implementation, determining whether the touch gesture is the swipe gesture within the portion of the UI comprising the media player includes determining the touch gesture corresponds to a swipe right gesture or a swipe left gesture starting on the portion of the UI displaying video item.

In one implementation, moving the playback of the video item from the first point in time to the second point in time by the predetermined amount of time includes forwarding the video item the predetermined amount of time in response to a swipe right gesture or rewinding the video item the predetermined amount of time in response to a swipe left gesture.

In another implementation, moving playback of the video item from the first point in time to the second point in time by the predetermined amount of time includes determining a length of the video item. The method further includes responsive to determining that the length of the video item is less than a threshold length, setting the predetermined amount of time to a first amount of time to move the playback of the video item. The method also includes responsive to determining that the length of the video is greater to or equal the threshold length, setting the predetermined amount of time to a second amount of time to move the playback of the video item. The second amount of time is greater than the first amount of time. In still another implementation, the predetermined amount of time the playback of the video is moved is a single fixed time for different video items and independent of the length of the different video items.

In other implementation, the method includes determining that the touch gesture is a swipe gesture not within the portion of the UI that includes the media player. The method further navigates to another video item in response to determining the touch gesture is the swipe gesture not within the portion of the UI comprising the media player.

In one implementation, determining that the touch gesture is the swipe gesture not within the portion of the UI including the media player includes determining the touch gesture corresponds to a swipe right gesture or a swipe left gesture starting on an edge portion of the UI. The edge portion is adjacent to and located outside the media player.

In still another implementation, navigating to another video item includes proceeding to a next video item in response to a swipe left gesture starting on an edge portion of the UI. The method further includes proceeding to a prior video item in in response to a swipe right gesture starting on the edge portion of the UI.

In additional implementations, one or more processing devices for performing the operations of the above described implementations are disclosed. Additionally, in implementations of the disclosure, a non-transitory computer readable storage medium stores instructions for performing the operations of the described implementations. Also in other implementations, systems for performing the operations of the described implementations are also disclosed

DETAILED DESCRIPTION

Figure 1A:
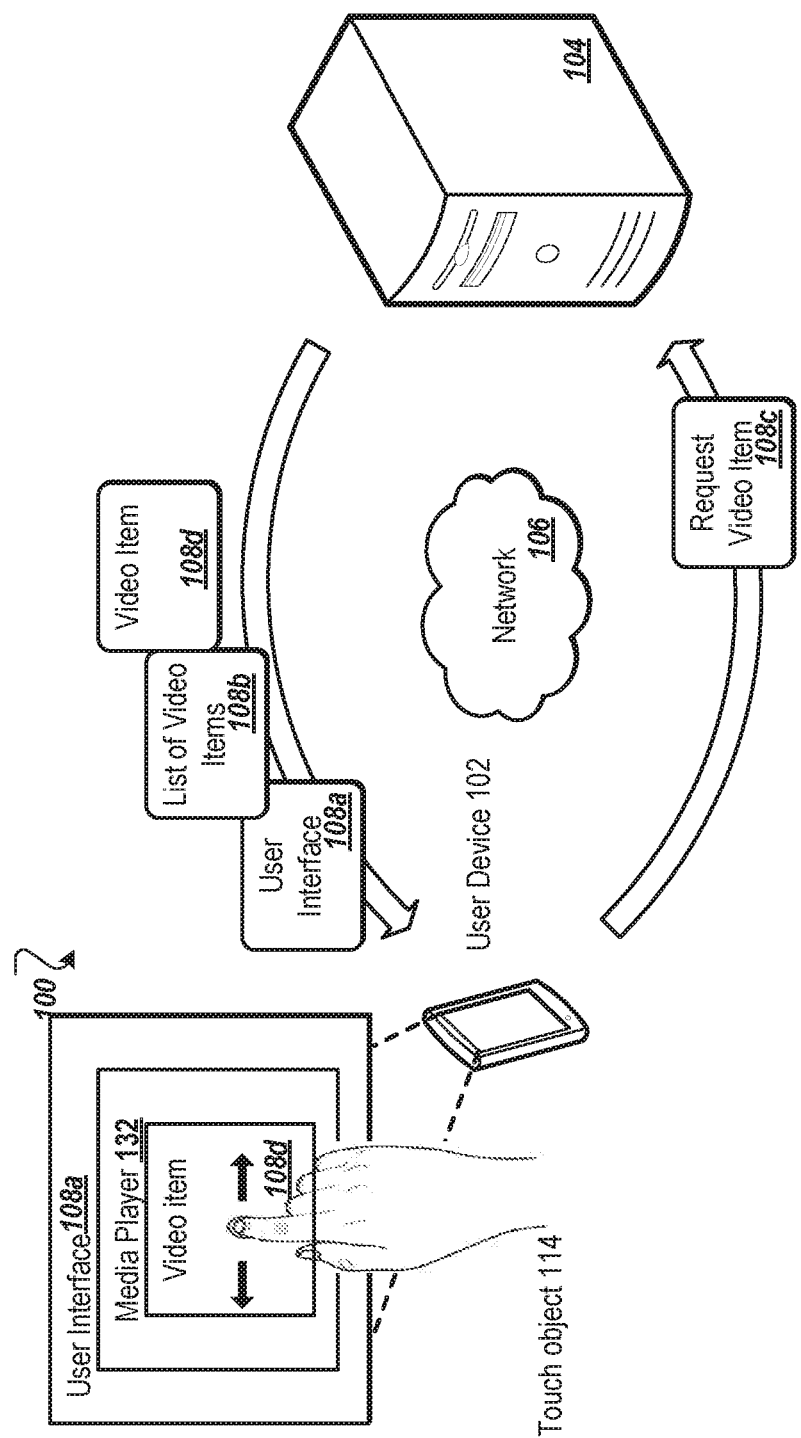
FIG. 1A is a block diagram illustrating a system architecture, in accordance with one implementation of the disclosure.

A media player on a user device, such as a mobile device, may be used to display a video item and may include various user interface (UI) elements (e.g., buttons, icons, etc.) to control playback of the video item and other UI elements to move from one video item to another video item. For example, the media player may include a UI element known as a scrubber to forward or rewind a video item. A scrubber may be represented by an icon that can be moved by a user to forward or rewind a video item proportionate to the distance the scrubber is moved in a respective direction. In another example, a media player may include a UI element (e.g., a button) to move from a current video item to another video item. Controlling the UI elements of the media player on a touchscreen of a mobile device may be particularly difficult and cumbersome due to size limitations of the touchscreen and the UI elements, in combination with a relatively large touch object, such as a finger. In one example, a user may have difficulty locating the button to move from one video item to another video item. In another example, a user may have difficulty not only locating a scrubber with a finger but also may have difficulty moving the scrubber a precise distance to forward or rewind the video item a desired amount.

Aspects of the present disclosure address the above-mentioned and other deficiencies by defining a set of gestures that simplify moving to a precise point in the video during the playback.

In one implementation, an application (referred to herein as a media viewer) executed on user device, such as a mobile device, provides a video item for playback in a portion of a user interface (UI) presented on the screen (touchscreen) of the mobile device. The portion of the user interface includes a media player playing the video item. The media viewer may monitor the touchscreen of the mobile device for swipe gestures made by a user of the mobile device. A swipe gesture may refer to a user's touch that has a particular direction but no on-screen target.

Upon detecting a swipe gesture of the user, the media viewer can determine whether the swipe gesture is within a portion of the user interface that includes the media player. For example, the media viewer can make such a determination based on a start point of the swipe gesture. If the start point of the swipe gesture is within the media player (e.g., the portion of the UI displaying the video item), then the swipe gesture is determined to be within the media player. Responsive to determining that the swipe gesture is within the portion of the user interface that includes the media player, the media viewer can determine if the swipe gesture is a swipe right gesture or swipe left gesture. If the swipe gesture is a swipe right gesture, the media viewer can forward the video a predetermined amount of time, such as 10 seconds. If the swipe gesture is a swipe left gesture, the user interface can rewind the video a predetermined amount of time, such as 10 seconds.

Alternatively, if the start point of the swipe gesture is not within the portion of the user interface that includes the media player, the media viewer can determine that the swipe gesture is not within the portion of the user interface that includes the media player. The media viewer can then determine if the swipe gesture is a swipe right gesture or swipe left gesture starting on an edge portion of the UI. An edge portion can refer to a user interface portion that is adjacent (e.g., right or left) to the media player. If the media viewer determines that the user made a swipe left gesture at the edge portion of the UI, the media viewer can provide a next video item for playback, such as the next video item in a playlist or a related video item. If the media viewer determines that the user made a swipe right gesture at the edge portion of the UI, the media viewer can provide a previous video item for playback, such as a previous video item in the playlist or a previously played video item.

Accordingly, aspects of the present disclosure allow users to swipe left or right on the video surface to easily move through the video timeline by a desired amount. As compared to the precise action of grabbing the scrubber to move it to a precise point in the video, the above swiping gestures provided by the aspects of the present disclosure significantly simplify user interaction with videos, especially with smaller-sized videos such as videos shown in portrait mode.

FIG. 1A is a block diagram illustrating a system architecture 100, according to an implementation. The system architecture 100 includes a user device 102 (e.g., a mobile device) in communication with a server system 104 over a network 106. The network 106 may include one or more computer devices, such as one or more of the computer devices that make up the Internet. In one implementation, network 106 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Figure 1B:
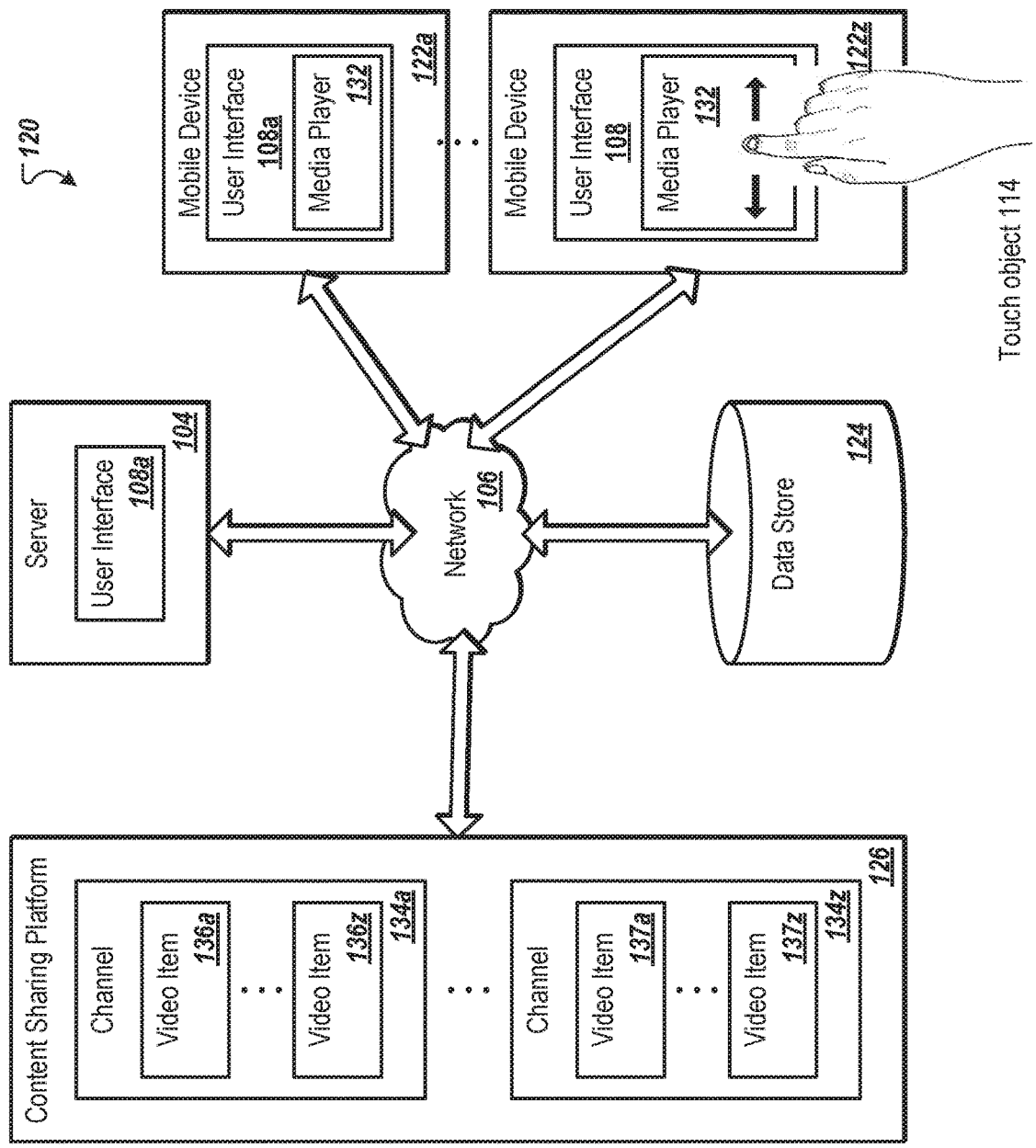
FIG. 1B is a block diagram illustrating a system architecture that includes a content sharing platform for providing video items, in accordance with another implementation of the disclosure.

In one implementation, the server system 104 may be one or more computing devices (e.g., a rackmount server, a server computer, etc.). In one implementation, the server system 104 may be included in the content sharing platform 126, as illustrated in FIG. 1B.

The user device 102 may be an electronic device that includes a processing device and touchscreen. For example, user device 102 may include a desktop computer, a mobile device, etc. A mobile device may, for example, be a tablet computer device, a mobile phone, a phablet, or other portable electronic device with a touchscreen.

The user device 102 may present a user interface 108a rendered by a media viewer (not shown), which can be a web browser or an application, (e.g., mobile application or mobile app) associated with the server system 104.

In one implementation, the media viewer may be an application that allows users to view content, such as images, videos (e.g., paid video content), web pages, documents, etc. For example, the media viewer may be a web browser that can access, retrieve, present, and/or navigate content (e.g., web pages such as Hyper Text Markup Language (HTML) pages, digital media items or content items, etc.) served by a web server. The media viewer may render, display, and/or present the content (e.g., a web page, a media viewer) to a user in the user interface 108a. The media viewer may also display an embedded media player (e.g., a Flash® player or an HTML5 player) that is embedded in a web page (e.g., a web page that may provide information about a product sold by an online merchant) rendered as the user interface 108a. In another example, the media viewer may be a standalone application (a mobile application or mobile app) that presents the user interface 108a allowing users to view digital media items (e.g., digital videos, digital images, electronic books, etc.). Additional details of some implementations of the media viewer are discussed in reference to at least FIGS. 2-4.

The server system 104 provides content (i.e., media items), such as video item 108d and a list of video items 108b that may include video item 108d, to the user device 102. A video item may include multiple pictures (e.g., frames) presented in a timed sequence to depict moving visual images. A video item may include an electronic file that can be executed or loaded using software, firmware or hardware configured to present the video item to a user. In one implementation, a video item is a full-frame rate video displayed at or greater than 24 frames per second. The description of content as video items is used for purposes of illustration rather than limitation. It should be appreciated that other content, such as audio items, may be presented by the user interface 108a.

The server system 104 may provide the list of video items 108b to the user device 102. The server system 104 may also provide a web page or a UI document to be rendered as the user interface 108a of the media viewer for presenting a list of video items 108b. A list of video items 108b may include multiple video items. In one example, the server system 104 may provide the list of video items 108b to the user device 102 in response to receiving a search request from the user device 102 for videos related to one or more search terms. The server system 104 may include or have access to an index of video items and corresponding video item information. The server system 104 may identify one or more videos for inclusion in the list of video items 108b that are responsive to the search request based on a search of the index.

Alternatively, the list of video items 108b may be a playlist or feed of related video items provided by the server system 104 or the server system 104 may automatically suggest the video items in the list of video items 108b. In some implementations, the server system 104 ensures that a list of video items is provided to the user device 102, such as by performing a search for video items, retrieving video items associated with a playlist, retrieving video items associated with a feed for a channel, or retrieving video items suggested to a user. For example, a user of the user device 102 may input a search for video items, select a playlist of video items, or select a channel of video items. The server system 104 then provides the list of video items 108b to the user device 102 in response to the search input, the playlist/channel selection, or automatically as a suggestion.

The user device 102 receives the list of video items 108b and presents the list of video items 108b to the user within the user interface 108a of the media viewer. The user device 102 may receive a user input in the user interface 108a selecting a video item 108d. In response, the user device 102 then sends a request 108c for the video item 108d to the server system 104 or another system if the video item is hosted by a system that is separate from the server system 104. The server system 104, or the separate video hosting system, then provides the video item 108d to the user device 102 for presentation in the user interface 108a of the media viewer.

The media viewer may monitor the touchscreen of the user device 102 for swipe gestures made by a user of the user device 102. Upon detecting a swipe gesture of the user, the media viewer can determine whether the swipe gesture is within a portion of the user interface 108a that includes the media player 132 (e.g., a swipe gesture by touch object 114). Responsive to determining that the swipe gesture is within the portion of the user interface 108a that includes the media player 132, the media viewer can determine if the swipe gesture is a swipe right gesture or swipe left gesture. If the swipe gesture is a swipe right gesture, the media viewer can forward the video a predetermined amount of time, such as 10 seconds. If the swipe gesture is a swipe left gesture, the user interface can rewind the video a predetermined amount of time, such as 10 seconds.

If the swipe gesture is outside the portion of the user interface 108a that includes the media player 132 (not shown), the media viewer can then determine if the swipe gestures is a swipe right gesture or swipe left gesture starting on an edge portion of the UI 108a. If the media viewer determines that the user made a swipe left gesture at the edge portion of the UI 108a, the media viewer can provide a next video item for playback, such as the next video item in the list 108b. If the media viewer determines that the user made a swipe right gesture at the edge portion of the UI 108a, the media viewer can provide a previous video item for playback, such as a previous video item from the list 108b or a previously played video item.

FIG. 1B is a block diagram illustrating a system architecture 120 that includes a content sharing platform 126 for providing video items. The content sharing platform 126 is in communication with multiple mobile devices 122a-z, a data store 124, and a server system 104 over a network 106. In one implementation, the data store 124 may be a memory (e.g., random access memory), a cache, a drive (e.g., a hard drive), a flash drive, a database system, or another type of component or device capable of storing data. The data store 124 may also include multiple storage components (e.g., multiple drives or multiple databases) that may also span multiple computing devices (e.g., multiple server computers).

The mobile devices 122a-z may be similar to user device 102 as described with respect to FIG. 1A. Each of the mobile devices 122a-z includes a media viewer providing a user interface 108a with a media player 132. The user interface 108a and/or media player 132 may be provided to the mobile devices 122a-z by the server system 104 and/or the content sharing platform 126. For example, the media player 132 may be an embedded media player that is embedded in user interface 108a provided by the content sharing platform 126.

In general, functions described in one implementation as being performed by the content sharing platform 126 can also be performed on the mobile devices 122a-z in other implementations, if appropriate. In addition, the functionality attributed to a particular component can be performed by different or multiple components operating together. The content sharing platform 126 can also be accessed as a service provided to other systems or devices through appropriate application programming interfaces, and thus is not limited to use in websites.

In one implementation, the content sharing platform 126 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to content and/or provide the content to the user. For example, the content sharing platform 126 may allow a user to consume, upload, search for, approve of ("like"), dislike, and/or comment on content, such as video items. The content sharing platform 126 may also include a website (e.g., a webpage) or provide a user interface 108a of a mobile application that may be used to provide a user with access to the content.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the content sharing platform 126.

The content sharing platform 126 may include multiple channels 134a-z. A channel may include content (or video items) available from a common source or content having a common topic, theme, or substance. The content can be digital content chosen by a user, digital content made available by a user, digital content uploaded by a user, digital content chosen by a content provider, digital content chosen by a broadcaster, etc. A channel may be associated with an owner, who is a user that can perform actions on the channel. Different activities may be associated with the channel based on the owner's actions, such as the owner making digital content available on the channel, the owner selecting (e.g., liking) digital content associated with another channel, the owner commenting on digital content associated with another channel, etc. The activities associated with the channel may be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user may be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of the channel 134a on the content sharing platform 126, feed items produced by the channel 134a may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 126 or other social networks may insert recommended content items into the user's syndicated feed, or may insert content items associated with a related connection of the user in the syndicated feed.

Each of the channels 134a-z can include one or more video items. For example channel 134a includes video items 136a-z and channel 134z includes video items 137a-z. Content included in channels 134a-z may include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, video times, etc. The video items 136a-z may be consumed via the Internet and/or via a mobile device application. In one implementation, the content sharing platform 126 may store the video items 136a-z in the data store 124.

In one implementation, the server system 104 may be included in the content sharing platform 126 or be part of a different system. The server system 104 may be or include the server system 104 which may provide the user interface 108a to the media viewer of the mobile devices 122a-z. Each of the mobile devices 122a-z may include a processing device, a memory, a touchscreen, and a media viewer that provides a user interface 108 including a media player 132.

As discussed above, the media viewer may monitor the touchscreen of the user device 102 for swipe gestures made by a user of the user device 102. For example touch object 114 may make a swipe right or swipe left gesture. The use of swipe gestures discussed herein allows users to easily move to desired points in a video item, even when the video item is a smaller-sized video such as a video shown on mobile device 122 in portrait mode.

Although implementations of the disclosure are discussed in terms of content sharing platforms, implementations may also be generally applied to any type of social network providing connections between users. Implementations of the disclosure are also not limited to content sharing platforms that provide channel subscriptions to users.

In situations in which the systems discussed here collect personal information about users, or may make use of personal information, the users may be provided with an opportunity to control whether the content sharing platform 126 collects user information (e.g., information about a user's social network, social actions or activities, profession, a user's preferences, a user's purchase transaction history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 126.

Figure 2:
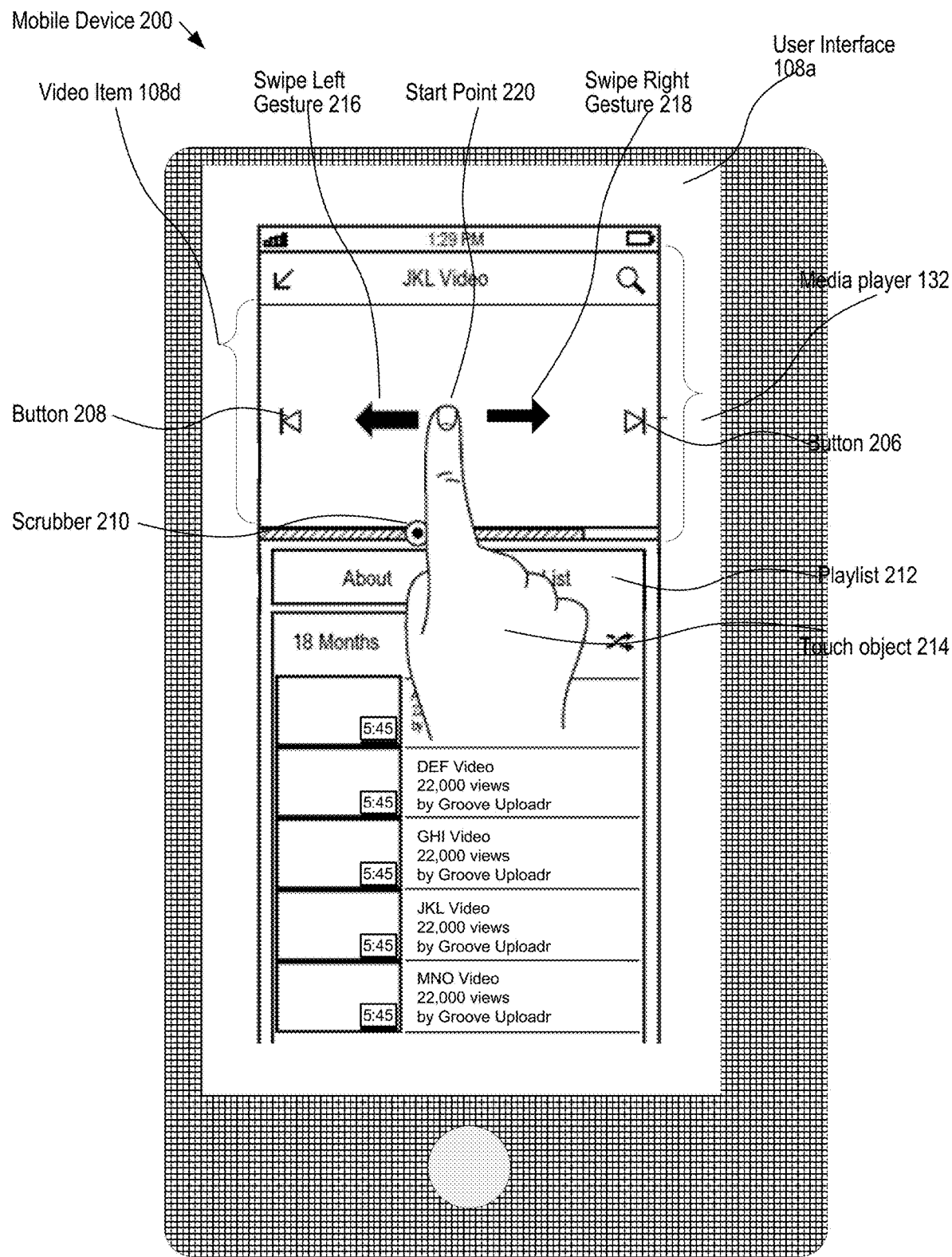
FIG. 2 is an example user interface presented on a mobile device, in accordance with an implementation of the disclosure.

FIG. 2 illustrates an example user interface 108a presented on mobile device 200, in accordance with an implementation of the disclosure. Mobile device 200 may be similar to the mobile devices described with respect to FIGS. 1A-1B. Mobile device 200 includes a touchscreen displaying user interface 108a of a media viewer. User interface 108a includes media player 132. User interface 108a may present playlist 212, which can be defined as a collection of one or more video items from users of the content sharing platform 126 that can be viewed in sequential or shuffled order without interaction from the viewer.

A viewing user can interact with the touchscreen of the mobile device 200 using a touch object 214. Touch object 214 may be any touch object such as a finger, a passive stylus, an active stylus, or the like. In one implementation, touch object 215 is a passive touch object. A passive touch object may be a conductive object that lacks a power source, such as a finger and passive stylus, capable of conducting an electric signal.

Media player 132 includes scrubber 210 and control elements 206 and 208. The scrubber 210 is a UI element that allows a user to scrub through a video by using the touch object 214. Control elements 206 and 208 are UI elements in the form of buttons, icons, etc. that allow a user move between media items in the list of media items. For example, button 206, when activated by a touch from touch object 214, causes the user interface 108a to navigate to a next video item in playlist 212, to a next related video item related to the video item 108d currently displayed on media player 132, etc. In another example, button 208 when activated by a touch from touch object 214, causes the user interface 108a to display a previous video item. A previous video item may refer to a video item the user has already viewed or a previous video item on a list, such as playlist 212.

Swipe left gesture 216 illustrates a touch gesture that is within the portion of user interface 108a that includes media player 132. Start point 220 of swipe left gesture 216 is on the surface of the touchscreen displaying the video item 108d (i.e., within a portion of user interface 108a displaying video item 108d). A swipe left gesture 216 with start point 220 within media player 132 may cause media player 132 to rewind the video item 108d a predetermined amount of time regardless of the length of the touch gesture, an interaction with scrubber 210, or the length of the touch gesture. In one example, swipe left gesture 216 may cause media player 132 to rewind the video item 108d 10 seconds.

Swipe right gesture 218 also illustrates a touch gesture that is within the portion of user interface 108a that includes media player 132. Start point 220 of swipe right gesture 218 is on the surface of the touchscreen displaying the video item 108d. A swipe right gesture 218 with start point 220 within media player 132 may cause media player 132 to forward the video a predetermined amount of time regardless of the length of the touch gesture and regardless of an interaction with scrubber 210. In one example, swipe right gesture 218 may cause media player 132 to rewind the video item 108d 10 seconds.

Swipe left gesture 216 and swipe right gesture with a start point 220 within the media player 132 may be part of the first set of predetermined touch gestures. It should be appreciated that right and left are relative terms. A video item 108d may be described as having an x-axis (horizontal) and y-axis (vertical), where right is a positive direction along the x-axis and left is a negative direction along the y-axis. A swipe right gesture may be a touch gesture that moves in positive direction (e.g., from a start point to an end point) along the x-axis. A swipe left gesture may be a touch gesture that moves in negative direction (e.g., from a start point to an end point) along the x-axis.

In one implementation, the media viewer executed by a processing device (not shown) of mobile device 200 may receive a video item 108d from server system 104, as illustrated in FIGS. 1A-1B. The media viewer provides video item 108d for playback in media player 132.

The media viewer monitors user input to the touchscreen of mobile device 200 for a touch gesture. The media viewer may monitor the scanning of the touchscreen displaying user interface 108a. The mobile device 200 may be scanning the touchscreen to detect a touch gesture made by the user of mobile device 200. For example, mobile device 200 may scan for changes in capacitance on a capacitive touchscreen to detect a touch gesture proximate the capacitive touchscreen.

The media viewer may receive an indication of a touch gesture made by the user. In one example, the mobile device 200 may provide a touchscreen API to the media viewer to enable touch gesture recognition by the media viewer. The touchscreen API may translate touch gestures made by the user on the touchscreen of the mobile device 200 into indications (e.g., data signals such as measurement values, location data, start point data, end point data, etc.) that are understandable to the media viewer.

The media viewer determines (e.g., using the above indication) whether the touch gesture is within the portion of the user interface 108a that includes media player 132. User interface 108a determines if a start point of the touch gestures (e.g., where on the touchscreen the touch gesture started) is within the media player 132 or outside the media player. In one implementation, the location within the media player 132 may refer to the area of user interface 108a displaying the video item 108d. In another implementation, the location within the media player 132 may refer to the area of user interface 108a displaying the video item 108d as well as some or all of the media player 132 itself (e.g., frame of media player, buttons of media player, etc.).

It should be appreciated that determining if a start point 220 of the touch gesture is within media player 132 may be accomplished in various ways. For example in another implementation, the media player 132 may be logically divided into three sections, such as a left section, a middle section, and a right section. A start point 220 of the touch gesture that is within media player 132 may be a touch gesture that starts in the middle section of media player 132.

If the media viewer determines that the start point of the touch gesture is within the portion of the user interface 108a that includes the media player, the media viewer decides if the touch gesture corresponds to one of a first set of predetermined touch gestures. The first set of predetermined touch gestures may include swipe right gesture 218 and swipe left gesture 216 with a start point 220 on the portion of the user interface 108a displaying video item 108d.

If the media viewer determines that the touch gesture corresponds to the first set of predetermined touch gestures, the media viewer moves the playback of the video item 108d form a first point in time to a second point in time by a predetermined amount of time. For example, if the media viewer determines the touch gesture is swipe right gesture 218, the media viewer may forward video item 108d from a current playback time of 2:00 minute (min) to 2:10 min, where 10 seconds is the predetermined amount of time. In another example, if the media viewer determines the touch gesture is swipe left gesture 216, the media viewer may rewind video item 108d from a current playback time of 2:00 min to 1:50 min, where 10 seconds is the predetermined amount of time. It should be noted that the moving of the playback time of the video item 108d may occur if media player 132 is playing video item 108d or if media player 132 is pausing video item 108d.

In one implementation, a predetermined amount of time is a single fixed time for different video items and independent of the length of a video item 108d. For example, all the video items of playlist 212, when displayed using media player 132, may be forwarded or rewound by 10 seconds in response to determining a swipe right gesture 218 or a swipe left gesture 216, respectively. An administrator, developer, or user may select the predetermined amount of time. For purposes of illustration, and not for limitation, a predetermined time of 10 seconds has been described. It should be appreciated the any length of time may be used for the predetermined amount of time, such as 5 seconds, 15 seconds, 30 seconds, 1 minute, etc.

In another implementation, the predetermined amount of time may depend on the length of video item 108d. For example, if video item 108d is 3:00 min in total length, rewinding or forwarding the video by 10 seconds may be appropriate. However, if video item 108d is 3 hours (hr), rewinding or forwarding the video by 10 seconds may have fewer benefits to a user. The length of the video item may be the playtime of the video item. User interface 108a may determine the length of video item 108d by, for example, examining the metadata of video item 108d.

The media viewer may compare the length of video item 108d to a threshold length. The threshold length may, for example, be 5 minutes. If the length of video item 108d satisfies a first threshold condition (e.g., it is less than the threshold length of 5 minutes), the media viewer sets the predetermined amount of time to a first amount of time, for example 10 seconds. If the length of video item 108d satisfies a second threshold condition (e.g., it is greater than or equal to the threshold length of 5 min), the media viewer sets the predetermined amount of time to a second amount of time, for example 30 seconds. It should be appreciated that the threshold length may any amount of time and be determined by an administrator, developer, or user. It should also be appreciated that one or more threshold lengths may be used. For example, in addition to a threshold length of 5 minutes as described above, an additional threshold length of 1 hour may be used. If the length of video item 108d is less than the threshold length of 5 minutes, the media viewer sets the predetermined amount of time to a first amount of time, such as 10 seconds. If the length of video item 108d is greater than or equal to the threshold length of 5 minutes, but less than 1 hour, the media viewer sets the predetermined amount of time to a second amount of time of 30 seconds. If the length of video item 108d is greater than or equal to the threshold length of 1 hour, the media viewer sets the predetermined amount of time to third amount of time, such as 1 minute.

In another implementation, a user may make a swipe left gesture 216 multiple times in successive order. In response, the media viewer may rewind the video item 108d item a predetermined amount for each swipe left gesture 216. For example, if a user makes a swipe left gesture 216 five times in a row, the media viewer will rewind the video item 108d five times at 10 seconds each, for a total of 50 seconds. Similarly, if a user makes swipe right gesture 218 multiple times in successive order, the media viewer may forward the video item 108d a predetermined amount for each swipe right gesture 218.

Figure 3:
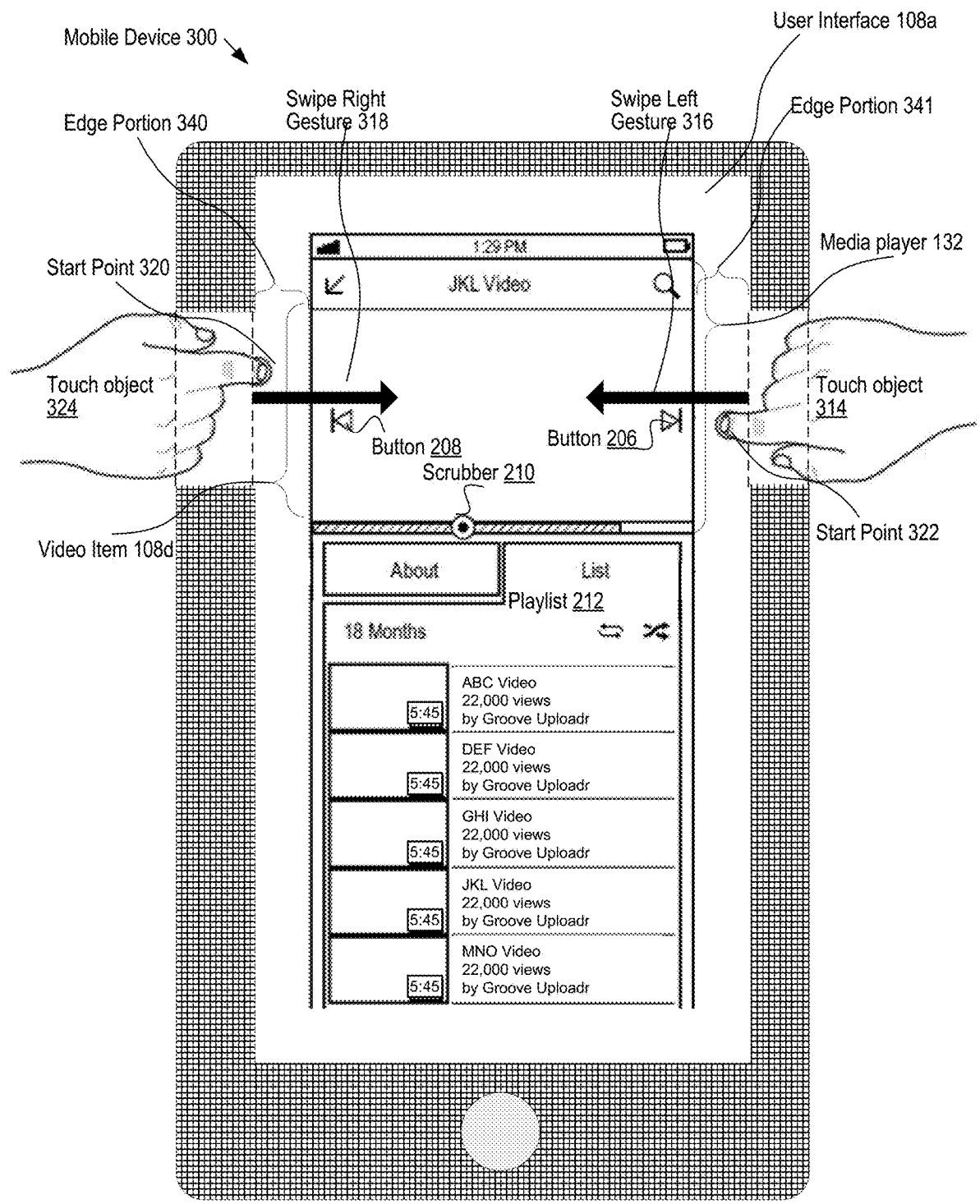
FIG. 3 is another example user interface presented on a user device, in accordance with another implementation of the disclosure.

FIG. 3 is an example user interface 108a presented on user device 300, in accordance with another implementation of the disclosure. Mobile device 300 may be similar to the mobile devices described with respect to FIG. 1A-1B. User interface 108a of mobile device 300 illustrates touch gestures, e.g., swipe right gesture 318 and swipe left gesture 316, that are not within the portion of user interface 108a that includes media player 132. Swipe right gesture 318 is a touch gesture that starts at start point 320 that is outside media player 132 and located within edge portion 340. Swipe left gesture 316 is a touch gesture that starts at start point 320 that is outside media player 132 and located within edge portion 341. In one implementation, edge portion 340 and edge portion 341 may include a portion of user interface 108a directly to the left and right, respectively, of video item 108d (e.g., the portion of the user interface 108a directly adjacent to the left and right, respectively, of video item 108d). In another implementation, edge portion 340 and edge portion 341 may include a portion of user interface 108a directly to the left or right, respectively, of media player 132 (e.g., includes some or all the frame and buttons of media player 132 as well as video item 108d).

In one implementation, in response to media viewer determining that the touch gesture is not within the portion of the user interface 108a that includes the media player, the media viewer determines that the touch gesture corresponds to a second set of predetermined touch gestures. In one example, the second set of predetermined touch gestures includes swipe left gesture 316 and swipe right gesture 318. If the media viewer determines that the touch gesture corresponds to swipe left gesture 316 or swipe right gesture 318, the media viewer navigates to another video item. As described above, swipe right gesture 318 and swipe left gesture 316 are touch gestures that start on edge portion 340 and edge portion 341, respectively.

If the media viewer determines the touch gesture is swipe left gesture 316, the media viewer will proceed to the next video item. If the media viewer determines the touch gesture is a swipe right gesture 318, user interface 108a will proceed to a prior video item.

Figure 4:
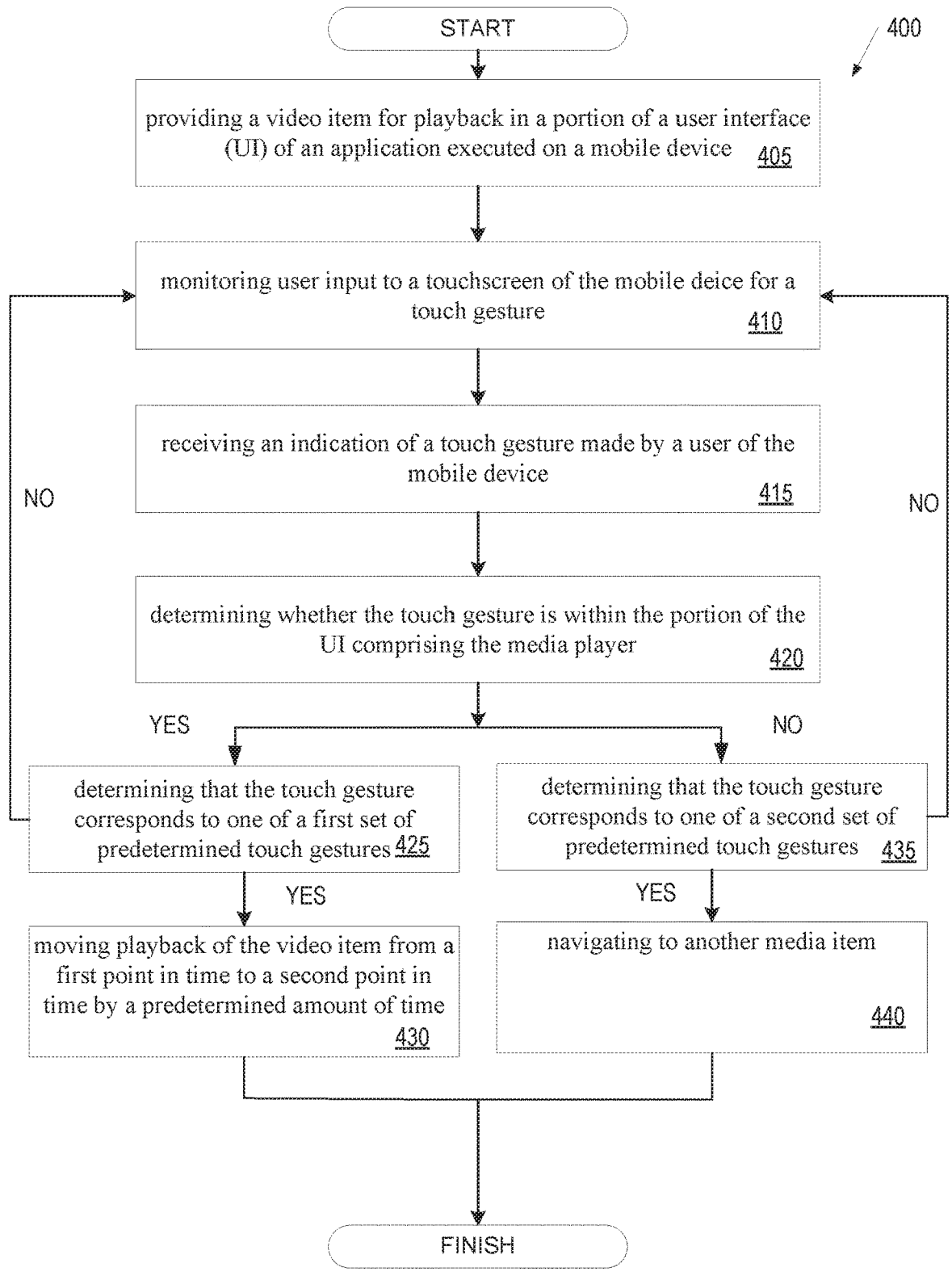
FIG. 4 is a flow diagram illustrating a method of touch gesture control of video playback, in accordance to some implementation of the disclosure.

FIG. 4 is a flow diagram illustrating a method of touch gesture control of video playback, in accordance to some implementation of the disclosure. Method 400 may be performed by processing logic that comprises hardware (e.g., circuitry, dedicated logic, programmable logic, microcode), software (e.g., instructions run on a processing device to perform hardware simulation), or a combination thereof. In one implementation, user interface 108a operating on a mobile device or user interface 108a operating on a server system 104 may perform some or all the operations described herein.

Method 400 begins at block 405 where processing logic performing the method provides video item 108d for playback in a portion of user interface 108a of an application (media viewer) executing on a user device 102. At block 410, processing logic monitors user input to a touchscreen of the user device 102 for a touch gesture. At block 415, processing logic receives an indication of a touch gesture made by a user of the user device 102. At block 420, processing logic determines wither the touch gesture is within the portion of the user interface 108a including a media player 132.

Processing logic moves to block 420 if processing logic determines the touch gesture is within a portion of the user interface 108a that includes media player 132. At block 425, processing logic determines if the touch gesture corresponds to a first set of predetermined touch gestures (e.g., swipe left gesture 216 or swipe right gesture 218 of FIG. 2). If the touch gesture does not correspond to the first set of predetermined touch gestures, processing logic returns to block 410 to monitor for user input of a touch gesture. If the touch gesture corresponds to the first set of predetermined touch gestures, processing logic proceeds to block 430 and moves playback of video item 108d from a first point in time to a second point in time by a predetermined amount of time. For example, if processing logic determines the touch gesture is a swipe left gesture 216, processing logic may forward video item 108d 10 seconds. If processing logic determines the touch gesture is swipe right gesture 218, processing logic may rewind the video item 108d 10 seconds.

Processing logic moves to block 435 if processing logic determines the touch gesture is not within a portion of the user interface 108a that includes the media player 132. At block 435, processing logic determines if the touch gesture corresponds to a second set of predetermined touch gestures (e.g., swipe right gesture 318 and swipe left gesture 316 of FIG. 3). If the touch gesture does not correspond to the second set of predetermined touch gestures, processing logic returns to block 410 to monitor for user input of a touch gesture. If the touch gesture does correspond to the second set of predetermined touch gestures, processing logic proceeds to block 440 to navigate to another video item. If processing logic determines the touch gesture is a swipe left gesture 316, processing logic proceeds to the next video item. If processing logic determines the touch gesture is a swipe right gesture 318, processing logic returns to a prior video item.

In an alternative implementation, after block 410 processing logic determines whether the touch gesture is a swipe gesture within the portion of the UI including the media player. If processing logic determines the touch gesture is a swipe gesture within the portion of the UI comprising the media player, moves the playback of the video item from a first point in time to a second point in time by a predetermined amount of time. If processing logic determines that the touch gesture is a swipe gesture not within the portion of the UI comprising the media player, processing logic navigates to another video item.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

Figure 5:
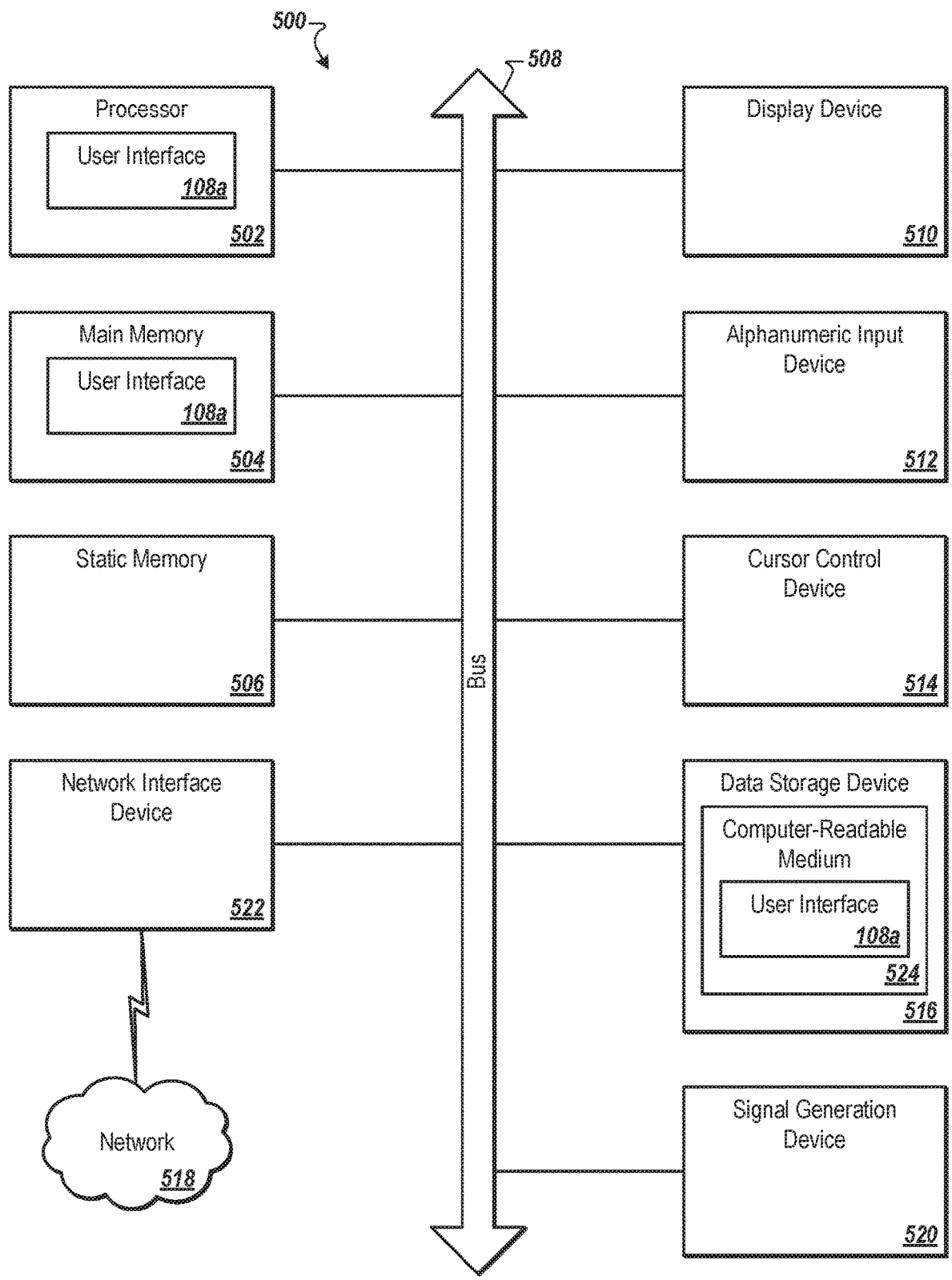
FIG. 5 is a block diagram illustrating an exemplary computer system, according to some implementations.

FIG. 5 is a block diagram illustrating an exemplary computer system 500. The computer system 500 executes one or more sets of instructions that cause the machine to perform any one or more of the methodologies discussed herein. Set of instructions, instructions, and the like may refer to instructions that, when executed computer system 500, cause computer system 500 to perform one or more operations of user interface 108a. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and the user interface 108a for performing the operations and steps discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100, the system architecture 120, and the user interface 108a embodying any one or more of the methodologies or functions described herein. The sets of instructions of the system architecture 100, the system architecture 120, and the user interface 108a may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "receiving", "providing", "determining", "moving", "forwarding", "rewinding", "setting", "monitoring", "navigating", "proceeding", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed:

1. A method, comprising:
   providing, by a processing device, a video item for playback at a media player executing at a user device, wherein the media player is logically divided into a plurality of sections;
   receiving an indication of a touch gesture made by a user with respect to a touchscreen of the user device;
   determining whether the touch gesture with respect to the touchscreen of the user device qualifies as a first predetermined touch gesture among a plurality of predetermined touch gestures based on determining that the touch gesture at least starts within a portion of a user interface (UI) comprised by a first section of the plurality of sections of the media player rather than starts within a portion of the UI comprised by other sections of the plurality of sections of the media player;
   responsive to determining that the touch gesture qualifies as the first predetermined touch gesture,
     determining a number of successive touch gestures that qualify as the first predetermined touch gesture, and
     responsive to determining the number of successive touch gestures that qualify as the first predetermined touch gesture, moving the playback of the video item from a first point in time to a second point in time by an amount of time reflecting the number of successive touch gestures and a predetermined amount of time associated the first predetermined touch gesture; and
   determining whether a second touch gesture with respect to the touchscreen of the user device qualifies as a second predetermined touch gesture among the plurality of predetermined touch gestures, wherein the second predetermined touch gesture at least starts within a portion of the UI located horizontal to and outside of the plurality of sections of the media player, and
   responsive to determining that the second touch gesture qualifies as the second predetermined touch gesture, navigating to another video item.

2. The method of claim 1, wherein the playback of the video item is moved from the first point in time to the second point in time by the predetermine amount of time without additional user input to select the second point in time for the playback of the video item and irrespective of a length of the touch gesture, and wherein the predetermined amount of time for moving the playback of the video item is a same fixed time for any video items, independent of a length of the any video items, and independent of a user selection of the predetermined amount of time.

3. The method of claim 1, wherein determining whether the touch gesture with respect to the touchscreen of the user device qualifies as the first predetermined touch gesture comprises:
   determining whether a start point of the touch gesture is located within the portion of the UI comprised by the first section of the media player.

4. The method of claim 1, further comprising:
determining whether a third touch gesture with respect to the touchscreen of the user device qualifies as a third predetermined touch gesture among the plurality of predetermined touch gestures, wherein the third predetermined touch gesture is within a portion of the UI comprised by a second section of the plurality of sections of the media player; and
responsive to determining that the third touch gesture with respect to the touchscreen of the user device qualifies as the third predetermined touch gesture that is within the portion of the UI comprised by the second section of the plurality of sections of the media player, rewinding the video item the predetermined amount of time.

5. The method of claim 1, wherein moving the playback of the video item from the first point in time to the second point in time by the predetermined amount of time comprises:
forwarding the video item the predetermined amount of time.

6. The method of claim 1, wherein the video item is a full-frame rate video displayed at or greater than 24 frames per second.

7. The method of claim 1, further comprising:
monitoring user input to the touchscreen of the user device for the touch gesture by scanning the touchscreen displaying the UI, the scanning to detect the touch gesture made by the user of the user device.

8. The method of claim 1, wherein the second predetermined touch gesture at least starts in the portion of the UI comprising the outside of the plurality of sections of of the media player and ends within the portion of the UI comprised by at least one of the plurality of sections of the media player.

9. The method of claim 1, wherein navigating to another video item comprises:
proceeding to a next video item in response to determining that the touch gesture comprises a swipe left gesture; and
proceeding to a prior video item in response to determining that the touch gesture comprises a swipe right gesture.

10. A non-transitory computer-readable medium storing instructions that, responsive to execution by a processing device, cause the processing device to perform operations comprising:
providing, by the processing device, a video item for playback at a media player executing at a user device, wherein the media player is logically divided into a plurality of sections;
receiving an indication of a touch gesture made by a user with respect to a touchscreen of the user device;
determining whether the touch gesture with respect to the touchscreen of the user device qualifies as a first predetermined touch gesture among a plurality of predetermined touch gestures based on determining that the touch gesture at least starts within a portion of a user interface (UI) comprised by a first section of the plurality of sections of the media player rather than starts within a portion of the UI comprised by other sections of the plurality of sections of the media player;
responsive to determining that the touch gesture qualifies as the first predetermined touch gesture,
determining a number of successive touch gestures that qualify as the first predetermined touch gesture, and
responsive to determining the number of successive touch gestures that qualify as the first predetermined touch gesture, moving the playback of the video item from a first point in time to a second point in time by an amount of time reflecting the number of successive touch gestures and a predetermined amount of time associated the first predetermined touch gesture; and
determining whether a second touch gesture with respect to the touchscreen of the user device qualifies as a second predetermined touch gesture among the plurality of predetermined touch gestures, wherein the second predetermined touch gesture at least starts within a portion of the UI located horizontal to and outside of the plurality of sections of the media player, and
responsive to determining that the second touch gesture qualifies as the second predetermined touch gesture, navigating to another video item.

11. The non-transitory computer-readable medium of claim 10, wherein the playback of the video item is moved from the first point in time to the second point in time by the predetermine amount of time without additional user input to select the second point in time for the playback of the video item and irrespective of a length of the touch gesture, and wherein the predetermined amount of time for moving the playback of the video item is a same fixed time for any video items, independent of a length of the any video items, and independent of a user selection of the predetermined amount of time.

12. The non-transitory computer-readable medium of claim 10, wherein determining whether the touch gesture with respect to the touchscreen of the user device qualifies as the first predetermined touch gesture comprises:
determining whether a start point of the touch gesture is located within the portion of the UI comprised by the first section of the media player.

13. The non-transitory computer-readable medium of claim 10, further comprising:
determining whether a third touch gesture with respect to the touchscreen of the user device qualifies as a third predetermined touch gesture among the plurality of predetermined touch gestures, wherein the third predetermined touch gesture is within a portion of the UI comprised by a second section of the plurality of sections of the media player; and
responsive to determining that the third touch gesture is with respect to the touchscreen of the user device qualifies as the third predetermined touch gesture that is within the portion of the UI comprised by the second section of the plurality of sections of the media player, rewinding the video item the predetermined amount of time.

14. The non-transitory computer-readable medium of claim 10, wherein the second predetermined touch gesture at least starts in the portion of the UI comprising the outside of the plurality of sections of the media player and ends within the portion of the UI comprised by at least one of the plurality of sections of the media player.

15. The non-transitory computer-readable medium of claim 10, wherein navigating to another video item comprises:
proceeding to a next video item in response to determining that the touch gesture comprises a swipe left gesture; and
proceeding to a prior video item in response to determining that the touch gesture comprises a swipe right gesture.

16. A system, comprising:
a memory; and
a processing device, coupled to the memory, to:
provide a video item for playback at a media player executing at a user device, wherein the media player is logically divided into a plurality of sections;
receive an indication of a touch gesture made by a user with respect to a touchscreen of the user device;
determine whether the touch gesture with respect to the touchscreen of the user device qualifies as a first predetermined touch gesture among a plurality of predetermined touch gestures based on determining that the touch gesture at least starts within a portion of a user interface (UI) comprised by a first section of the plurality of sections of the media player rather than starts within a portion of the UI comprised by other sections of the plurality of sections of the media player;
responsive to determining that the touch gesture qualifies as the first predetermined touch gesture,
determining a number of successive touch gestures that qualify as the first predetermined touch gesture, and
responsive to determining the number of successive touch gestures that qualify as the first predetermined touch gesture, move the playback of the video item from a first point in time to a second point in time by an amount of time reflecting the number of successive touch gestures and a predetermined amount of time associated the first predetermined touch gesture; and
determine whether a second touch gesture with respect to the touchscreen of the user device qualifies as a second predetermined touch gesture among the plurality of predetermined touch gestures, wherein the second predetermined touch gesture at least starts within a portion of the UI located horizontal to and outside of the plurality of sections of the media player, and
responsive to determining that the second touch gesture qualifies as the second predetermined touch gesture, navigate to another video item.

17. The system of claim 16, wherein the playback of the video item is moved from the first point in time to the second point in time by the predetermine amount of time without additional user input to select the second point in time for the playback of the video item and irrespective of a length of the touch gesture, and wherein the predetermined amount of time for moving the playback of the video item is a same fixed time for any video items, independent of a length of the any video items, and independent of a user selection of the predetermined amount of time.

* * * * *